United States Patent [19]
Brown et al.

[11] Patent Number: 5,983,242
[45] Date of Patent: Nov. 9, 1999

[54] METHOD AND SYSTEM FOR PRESERVING DOCUMENT INTEGRITY

[75] Inventors: Kevin Lane Brown, Issaquah; Ronald Andrew Fein; Eric A. LeVine, both of Seattle; Thomas W. Saxton, Issaquah, all of Wash.

[73] Assignee: Microsoft Corporation, Redmond, Wash.

[21] Appl. No.: 08/886,702

[22] Filed: Jul. 1, 1997

[51] Int. Cl.$^6$ .................................................. G06F 17/30
[52] U.S. Cl. .................... 707/203; 707/103; 707/104; 707/511
[58] Field of Search ................... 707/103, 104, 707/203, 511; 395/712

[56] References Cited

U.S. PATENT DOCUMENTS

| | | | |
|---|---|---|---|
| 4,558,413 | 12/1985 | Schmidt et al. | 707/203 |
| 4,627,019 | 12/1986 | Ng | 707/203 |
| 4,646,229 | 2/1987 | Boyle | 707/203 |
| 4,751,740 | 6/1988 | Wright | 382/180 |
| 4,807,182 | 2/1989 | Queen | 707/3 |
| 5,485,606 | 1/1996 | Midgdey et al. | 707/10 |
| 5,504,879 | 4/1996 | Eisenberg et al. | 707/203 |
| 5,642,503 | 6/1997 | Reiter | 707/8 |
| 5,706,510 | 1/1998 | Burgoon | 707/203 |
| 5,740,405 | 4/1998 | Degraaf | 707/203 |
| 5,745,906 | 4/1998 | Squibb | 707/203 |
| 5,805,899 | 9/1998 | Evans et al. | 395/712 |
| 5,806,078 | 9/1998 | Hug et al. | 707/511 |
| 5,870,764 | 2/1999 | Lo et al. | 707/203 |
| 5,873,097 | 2/1999 | Harris et al. | 707/203 |

*Primary Examiner*—Paul R. Lintz
*Assistant Examiner*—Shahid Alam
*Attorney, Agent, or Firm*—Jones & Askew, LLP

[57] ABSTRACT

A method and system for preserving document integrity between potentially partially incompatible versions of a program module by maintaining forwards compatibility and backwards compatibility. Version (n') of the program module is released after version (n). A "saved by version (n)" bit may be activated any time that version (n) saves a file. The "saved by version (n)" bit indicates to subsequently-released versions, such as version (n'), that the file has been saved by version (n) and, based upon this information, appropriate action should be taken by the subsequently-released version. A "warning from future version" bit may be activated to indicate that a feature or features of the subsequently-released version is not supported by version (n). Based upon receiving this bit, version (n) may open the file with these features disabled or may take some other appropriate action.

13 Claims, 6 Drawing Sheets

METHOD AND SYSTEM FOR PRESERVING DOCUMENT INTEGRITY

TECHNICAL FIELD

This invention relates to preserving document integrity between potentially partially incompatible versions of a program module. More particularly, this invention relates to a method and system for providing forwards compatibility and backwards compatibility between potentially partially incompatible versions of a program module.

BACKGROUND OF THE INVENTION

Most modern application program modules, such as word processing program modules, are enhanced by designers from time to time to add features to the program module and to correct bugs in the program module. An enhanced or corrected program module is typically assigned a new version number to indicate that changes have been made to the program module. For example, the first version of a program module may be labeled version 1.0 and a later-released version that corrects some of the bugs in version 1.0 may be labeled version 1.1.

Adding new features to a program module or correcting bugs in a program module may require a change in the format of files saved by the program module. The file format is the structure that defines the manner in which the file is stored and laid out on a computer screen or in print. A file format may be fairly simple and common, such as the file format for files stored as ASCII text. A file format may also be quite complex and include various types of control instructions and codes used by printers or other external devices. Some further examples of file formats include Rich Text Format (RTF), Document Content Architecture (DCA), Data Interchange Format (DIF), Drawing Interchange Format (DXF), Tag Image File Format (TIFF), and Encapsulated PostScript Format (EPSF). Different versions of an application program module will typically have slightly different file formats due to added features or corrections of bugs in more advanced versions.

Any program module that changes its file format when releasing a new version has to deal with compatibility issues between different versions of the program module. More particularly, compatibility issues mean backwards compatibility and forwards compatibility. In describing backwards compatibility and forwards compatibility, it is helpful to consider two versions of a program module which will be referred to as version (n) and version (n'). For sake of example, version (n) is a version of a program module that has been released prior to version (n'). Backwards compatibility is the ability of version (n') of a program module to read files created by version (n) of the program module. In other words, backwards compatibility is the ability of a version of a program module to read files created by prior-released versions of the program module. On the other hand, forwards compatibility is the ability of version (n) of a program module to read files created by version (n') of the program module. In other words, forwards compatibility is the ability of a version of a program module to read files created by subsequently-released versions of the program module.

All program modules should have strong backwards compatibility because, at the time version (n') is released, the software designers theoretically know all there is to know about version (n). Thus, backwards compatibility is sometimes simply an issue of writing conversion code. However, if version (n) includes serious bugs in writing or saving files, then it may be difficult to write conversion code because, in essence, all of the serious bugs must be replicated in the conversion code. Thus, there is a need in the art for a method and system for providing backwards compatibility that does not require writing complicated and detailed conversion code.

In addition to seeking backwards compatibility, software designers seek forwards compatibility because breaking forwards compatibility makes it difficult for users to have mixed shops. A mixed shop is an environment in which users are operating different versions of a program module. For instance, in a mixed shop, some users may be using version (n) of a program module, some users may be using version (n') of the program module, some users may be using version (n") of the program module, etc. If a program module is not forwards compatible, then a user operating version (n) may not be able to read files that have been edited by a user operating version (n'). Thus, forwards compatibility is particularly important to mixed shop users.

To maintain forwards compatibility, some program modules have internal mechanisms that allow a version to recognize that a given file is too "advanced" to be opened. Typically, forwards compatibility is maintained by storing a version stamp, or other similar data property, with a file. The version stamp indicates which version of the program module last stored the file.

A version of a program module also typically includes a numerical value which indicates the highest version stamp that a file can have and still be opened by that particular version. This numerical value will be referred to herein as the "too advanced" value. If the version stamp of a file is higher than the "too advanced" value, then it is too "advanced" for that particular version to open. For example, suppose version (n') of a program module stores files with a version stamp equal to 100. Before version (n) attempts to open one of these files, version (n) compares its "too advanced" value with the version stamp of the file, i.e., 100. If the "too advanced" value of version (n) is less than this version stamp, then version (n) cannot open the file. On the other hand, if the "too advanced" value is greater than or equal to the version stamp, then version (n) can open the file.

Typically, if a file is determined to be too "advanced" to be opened, a separate external converter is used to convert the file to an older format, i.e., a less "advanced" file format, which can be opened. Although the version stamp technique and external converter work well in many instances, it is not without its drawbacks.

One drawback of the version stamp technique is that even slight changes in the file format results in a higher version stamp. This new version stamp may be so large that previous versions of the program module may not be able to read files with the new version stamp. Thus, an external converter must be used to convert these files to a less "advanced" file format. The need to use external converters can be annoying to users, especially in mixed shops in which conversion of files may need to be performed frequently. Thus, there is a need in the art for a method and system for providing forwards compatibility that does not require the use of an external converter.

Another drawback of the version stamp technique is that the decision that a file stored by a new version can not be opened by an older version may be too harsh in certain circumstances. For example, it may be possible that the older version could open a file created by a newer version if certain features are disabled. In this example, insisting on converting a file with an external converter may be too harsh because the older version could instead simply disable certain features and open the file. Thus, there is a further need in the art for a method and system for providing forwards compatibility that accommodates minor changes in file format.

Another problem is that every version release has bugs. The program designers may decide that, for feature X, the bugs are sufficiently rare or unimportant that version (n) may confidently be released with feature X as is. However, the same program designers may anticipate that, in version (n'), feature Y might be implemented and depend on feature X. Therefore, it can be anticipated that the same bugs that were rare or unimportant in version (n), plus others that are not known, may turn out to be a problem in version (n'). Thus, two different versions of a program module may be incompatible with respect to certain features. There is a need in the art for a method and system that allows version (n) to signal to version (n') that version (n) has edited a document, thus possibly corrupting the feature as far as version (n') is concerned. There is still a further need in the art for a method and system for version (n') to signal to version (n) that the document was edited by version (n') and certain features may be corrupt as far as version (n) is concerned.

SUMMARY OF THE INVENTION

The present invention satisfies the above described needs by providing a system and method for preserving document integrity between potentially partially incompatible versions of a program module. Generally described, the present invention provides a computer-implemented method that supports forwards compatibility and backwards compatibility between two versions of a program module.

In one aspect, the present invention provides a method for preserving document integrity between a first version of a program module and a second version of the program module that is released after the first version. A backwards compatibility bit, also referred to herein as the "saved by version (n)" bit, in a file format of a document or file is activated when the document is saved by the first version. When the second version opens the document, the second version determines whether the backwards compatibility bit is activated. If so, then the second version responds to the activated backwards compatibility bit so that the document may be opened by the second version and backwards compatibility may be maintained.

The response of the second version depends on what the software designers of the second version have determined to be appropriate based on possible bugs in certain features of the first version. For example, the second version may search for corrupt undo stack entries and open the document while ignoring the corrupt undo stack entries. The second version may also search for other possible corrupt features and ignore these features after reading the backwards compatibility bit.

In another aspect, the present invention provides a method for activating a backwards compatibility property to preserve document integrity between a first version of a program module and a second version of the program module. The first version determines whether the backwards compatibility property in a file format of a document or file saved by the first version is activated and if not, then the first version sets the backwards compatibility property equal to a predetermined value. The backwards compatibility property may be a bit which is set equal to a predetermined binary value to indicate that the document has been saved by the first version.

In yet another aspect, the present invention provides a method for preserving document integrity between a first version of a program module and a second version of the program module. A forwards compatibility property, or "warning from future version" property, is activated in a file format of a document saved by the second version. When the first version examines the document, it determines whether the forwards compatibility property is activated. If so, then the first version determines whether the document should be opened and, if so, then the first version opens the document in a safe condition. The first version may determine whether the forwards compatibility property is activated by determining whether the forwards compatibility property is equal to a predetermined value.

To determine whether the document should be opened, the first version may display an alert dialog on a monitor. The user then inputs whether or not the document should be opened with the possibly corrupt features removed. If so, then the first version opens the document with the possible corrupt features removed.

In yet another aspect, the first version may open the document in a safe condition by opening the document as a read-only copy of the document without loading any corrupt feature. The first version then de-activates the forwards compatibility property by setting it equal to a second predetermined value.

In still another aspect, the present invention is provided on a computer-readable medium having a number of file format properties stored on the medium and representing a data structure for a file created by an application program module. One of the file format properties contains data representing whether the file has been saved by a first version of the program module. A second file format property contains data representing instructions from a second version of the program module, the second version having been released after the first version.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
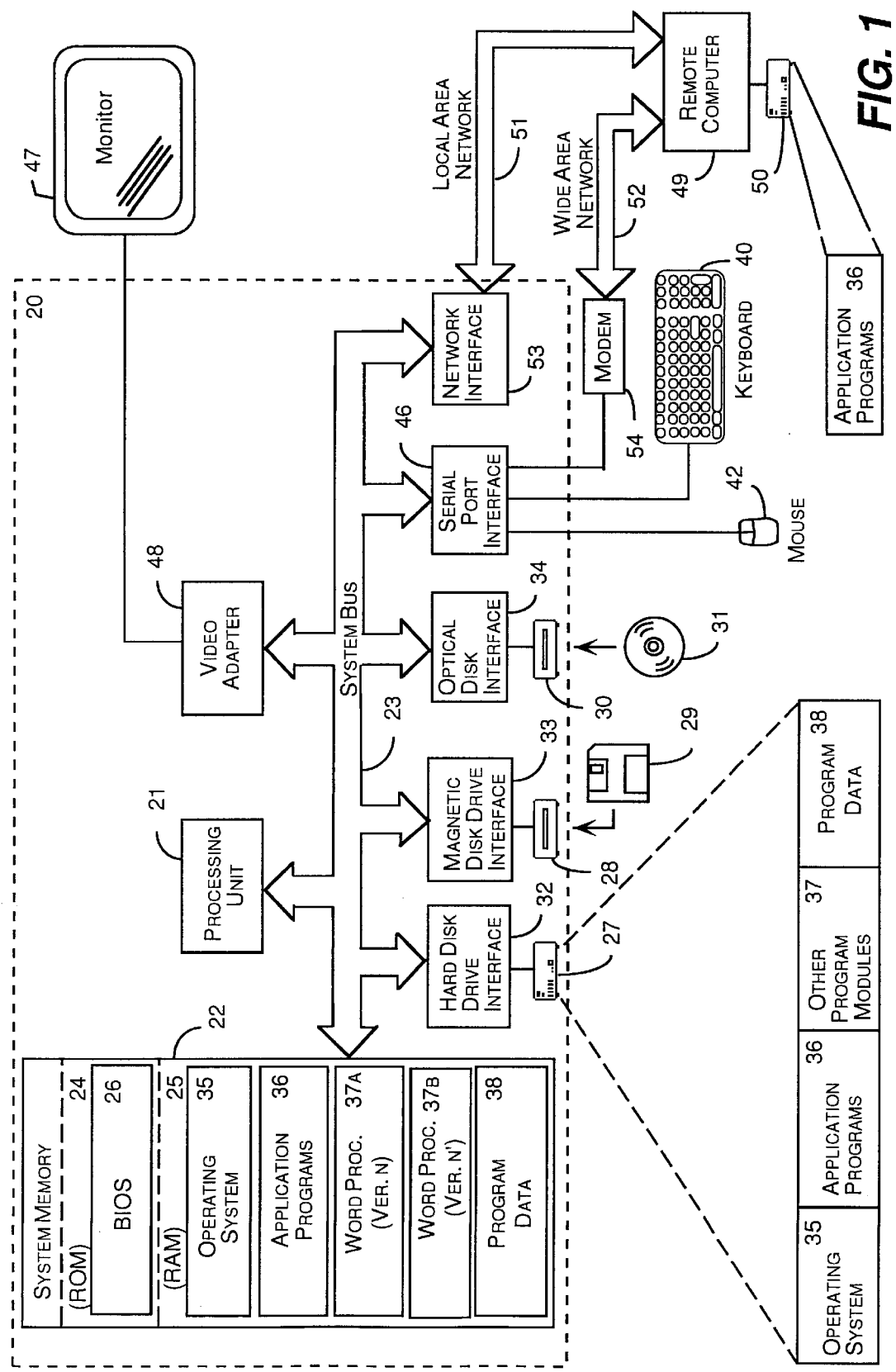
FIG. 1 is a block diagram of a computer that provides the operating environment for an exemplary embodiment of the present invention.

The present invention is directed toward a method and system for preserving document integrity between potentially partially incompatible versions of a program module. Preserving document integrity particularly refers to maintaining forwards compatibility and backwards compatibility between different versions of a program module.

In one embodiment, the invention is incorporated into a word processing application program entitled "WORD 8.0", marketed by Microsoft Corporation of Redmond, Wash. Briefly described, the preferred application program allows a user to create and edit electronic documents by entering characters, symbols, graphical objects, and commands. The preferred application program stores documents, also referred to as files, using a file format which defines the manner in which the file is stored and laid out on a screen or in print. The file format includes various types of control instructions and codes that may be used by a printer or other external device.

For example, two bits can be stored in the file formats of potentially partially incompatible versions of the word processing application program. One bit will be referred to as the "saved by version (n)" bit. The second bit will be referred to as the "warning from future version" bit.

In order to describe a representative embodiment of the present invention, one version of "WORD" will be referred to as version (n), or "WORD 8.0", throughout this specification. The second version of "WORD" will be referred to as version (n'), or "WORD X", throughout this specification. Version (n'), or "WORD X", is a version of "WORD" that is to be released at some point in time after the release of version (n), or "WORD 8.0". The "saved by version (n)" bit and the "warning from future version" bit will be briefly described below with reference to version (n) and version (n') as described above.

In one embodiment of the present invention, a "saved by version (n)" bit may be activated any time that version (n) saves a file. The "saved by version (n)" bit is also referred to herein as the backwards compatibility bit. The "saved by version (n)" bit indicates to subsequently-released versions, such as version (n'), that the file has been saved by version (n) and, based upon this information, appropriate action should be taken by the subsequently-released version.

In another embodiment of the present invention, a "warning from future version" bit may be activated by a version of the application program module released subsequently to version (n), such as version (n'). The "warning from future version" bit is also referred to herein as the forwards compatibility bit. The "warning from future version" bit may be activated to indicate that a feature or features of the subsequently-released version are not supported by version (n). Based upon receiving this bit, version (n) may open the file with these features disabled or may take some other appropriate action.

Therefore, in essence, the present invention, in one embodiment, provides communication from a past version of "WORD" to a future version of "WORD" via the "saved by version (n)" bit. The present invention, in another embodiment, provides communication from a future version of "WORD" to a past version of "WORD" via the "warning from future version" bit. By taking appropriate action in response to these bits, forwards compatibility and backwards compatibility of "WORD" is maintained.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module (version n) 37*a*, a word processor program module (version n') 37*b*, program data 38, and other program modules (not shown). Word processor program module (version n') 37*b* is a subsequently-released version of word processor program module (version n) 37*a* as will be described below in more detail.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Release Dates of Version (n) and Version (n')

As mentioned above, in order to describe the present invention it is helpful to consider the release dates of two versions of a word processor program module, version (n) 37a and version (n') 37b. It should be understood that version (n) 37a is preferably "WORD 8.0" and that version (n') 37b is preferably "WORD X", a version of "WORD" that is to be released on some date in the future.

Figure 2:
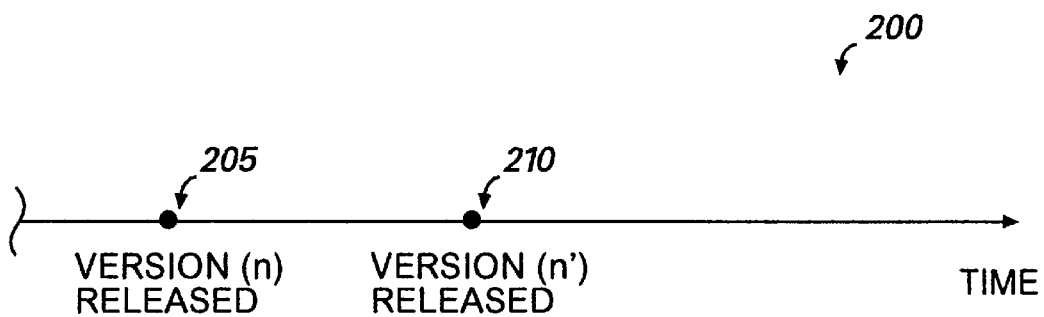
FIG. 2 is an illustration of a time line illustrating the release dates of version (n) and version (n').

Referring now to FIG. 2, an illustration of a time line 200 is presented. As shown in FIG. 2, version (n) is released on date 205 and version (n') is released on date 210. As illustrated by FIG. 2, date 210 is after date 205 to illustrate that version (n') is released after version (n). The concept that version (n') is released after version (n) is important in understanding the present invention. The description of the present invention proceeds under the assumption that version (n') is released after version (n) and, thus, the designers of version (n') know most of the bugs of version (n) when designing version (n').

File Formats

In order to describe the present invention, it is also helpful to understand file formats. Adding new features to a program module or correcting bugs in a program module may require a change in the file format of files saved by the program module. The file format is the structure that defines the manner in which the file is stored and laid out on a computer screen or in print. A file format may be quite complex and may include various types of control instructions and codes used by printers or other external devices. Different versions of an application program module will typically have slightly different file formats due to added features or corrections of bugs in the newer, more advanced versions. For example, version (n') 37b will probably have features slightly different than those of version (n), and, thus, will probably have a different file format than the file format of version (n) 37a.

Figure 3:
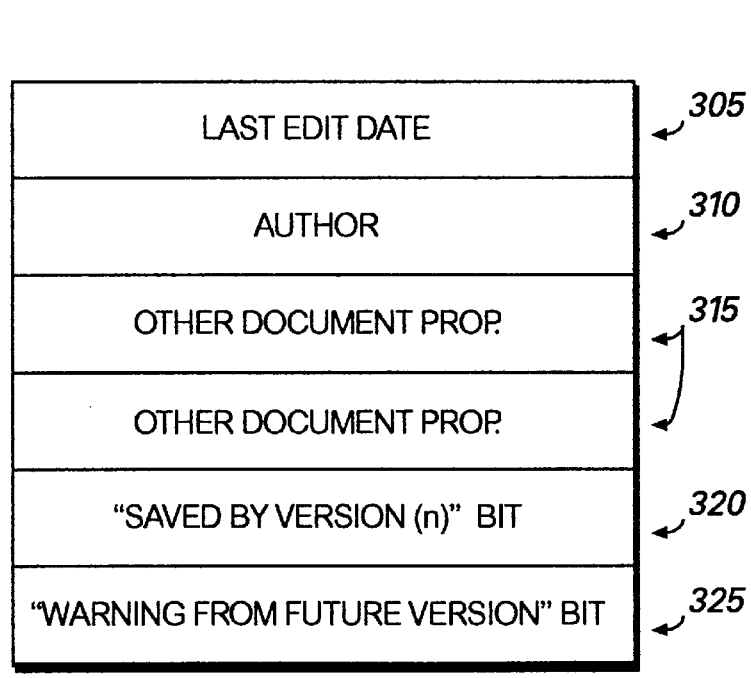
FIG. 3 is a tabular illustration of the file format of a file saved by version (n) in accordance with an embodiment of the present invention

Referring now to FIG. 3, a tabular illustration of the file format 300 of a file saved by version (n) 37a in accordance with an embodiment of the present invention is shown. It should be understood that FIG. 3 is intended as a high-level illustration of file format 300 and does not illustrate all of the document properties of the file format 300 of a file saved by version (n) 37a. The file format 300 includes document properties which are known in the art, such as the date the file was last edited 305, the author of the file 310, and other document properties 315 known to those skilled in the art.

The file format 300 further includes a unique "saved by version (n)" bit 320 and a unique "warning from future version" bit 325. It should be understood that the file format (not shown) of version (n') 37b also preferably includes the "saved by version (n)" bit 320 and the "warning from future version" bit 325. The "saved by version (n)" bit 320 and the "warning from future version" bit 325 are unique to the present invention and will be described in detail below.

Undo Stack

In order to describe the preferred embodiment of the present invention, it is helpful to understand the concept of an undo stack. The undo stack is a stack representation of the changes made to a document by a user or automatically made by the word processor program module 37a or 37b. The undo stack for a file can be stored in the file format. The undo stack for a file may be used by a variety of features such as the undo feature. For example, the undo feature allows a user to reverse, or "undo", the last edit made to a document by removing the last undo entry of the undo stack. The operation of an undo stack is well-known to those of skill in the art.

Preserving Document Integrity

Briefly described, the present invention provides a method and system for preserving document integrity between potentially partially incompatible versions of an application program module. To preserve document integrity, a "saved by version (n)" bit and a "warning from future version" bit may be stored in the file formats of version (n) 37a and version (n') 37b. These bits and the implications of these bits will be described in detail below.

"Saved by Version (n)" Bit

As described above in reference to FIG. 3, an embodiment of the present invention includes a "saved by version (n)" bit in the file format. The "saved by version n" bit is activated every time that version (n) 37a saves a document, or file. Preferably, the "saved by version (n)" bit is only activated when version (n) saves a document and is not activated when any other version, such as version (n') 37b, saves a document.

An activated "saved by version (n)" bit may be used to communicate to future versions that version (n) 37a saved the document described by the file format. For example, version (n') may be programmed to examine the "saved by version (n)" bit when opening a document and to determine whether the "saved by version (n)" bit is activated. The determination that version (n) saved a document may be important to version (n') for different reasons such as those described below.

The determination that version (n) saved a document may be important if version (n) has bugs in recording the undo stack. The undo stack of version (n) 37a is virtually impossible to fully test due to its complexity. Therefore, it is possible that version (n) will have bugs in its recording of the undo stack and that these bugs will be discovered prior to releasing version (n'). Thus, it may be important for version (n') to realize that version (n) saved a document so that the bugs in the undo stack may be addressed by version (n').

For example, it could be that version (n) corrupts certain types of undo entries, but all others are not corrupted. In that case, version (n') would simply use the "saved by version (n)" bit as a cue to look for those particular undo entries that are corrupt and ignore those undo entries.

On the other hand, it is possible that version (n) records the undo stack properly, i.e., it does not contain any bugs in its recording of the undo stack. If it is determined that version (n) records the undo stack properly, then the "saved by version (n)" bit may be ignored by version (n'). Having described the general implications of the "saved by version (n)" bit, a description of the method 400 for activating the bit is described below.

Figure 4:
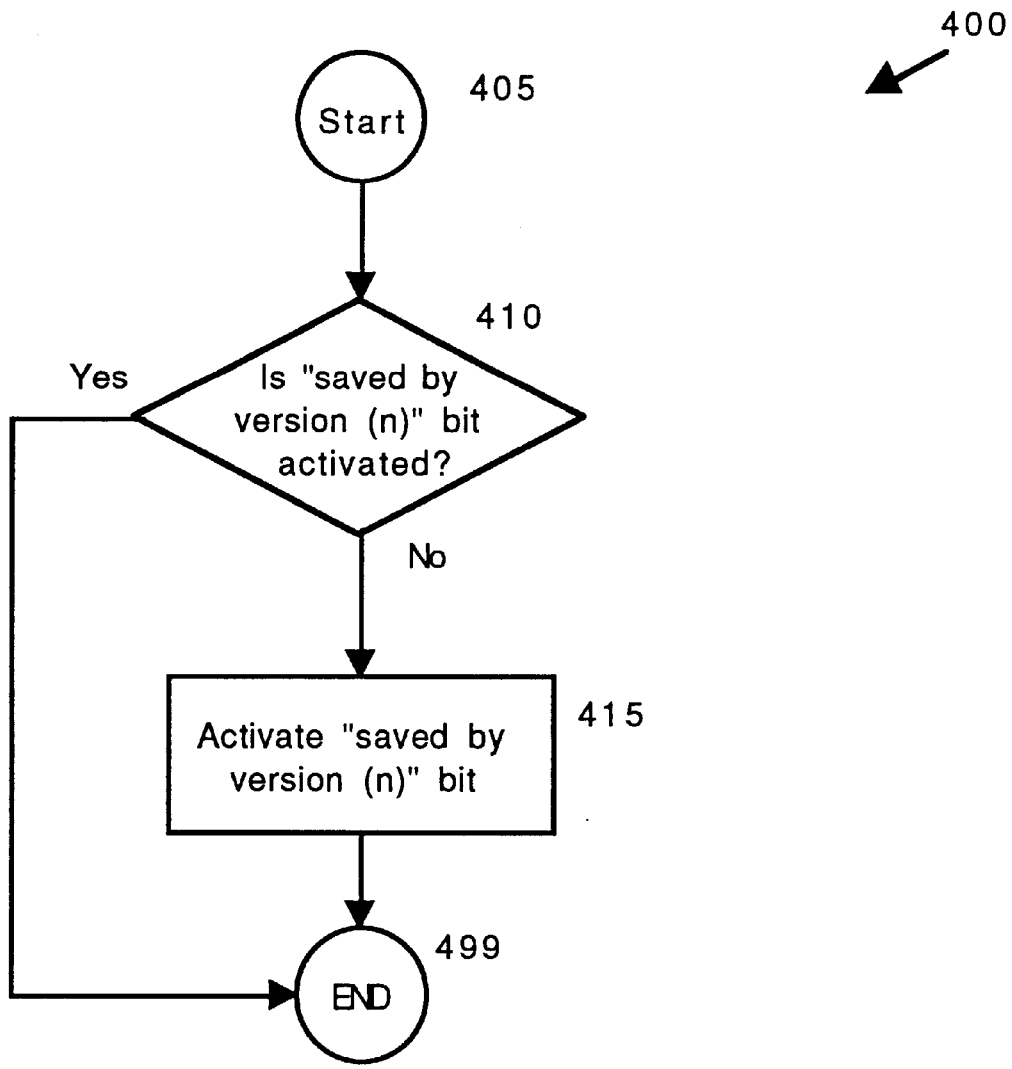
FIG. 4 is a flowchart illustrating a method for activating a "saved oy version (n)" bit in accordance with an embodiment of the present invention.

FIG. 4 is a flowchart illustrating a method 400 for activating the "saved by version (n)" bit 320 in accordance with an embodiment of the present invention. Those skilled in the art will appreciate that this exemplary embodiment is a computer-implemented process that is carried out by the computer in response to input from the user and instructions provided by the preferred application program module.

The method 400 begins at start step 405 and proceeds to decision step 410 when a file, or document, is saved by version (n) 37a. At decision step 410, it is determined whether or not the "saved by version (n)" bit is activated. If the "saved by version (n)" bit is not activated, then the method proceeds to step 415.

At step 415, the "saved by version (n)" bit is activated and the method ends at step 499. "Activating" the "saved by version (n)" bit refers to setting it equal to a predetermined value. For example, the "saved by version (n)" bit may be activated by setting it equal to zero. Alternatively, and preferably, the "saved by version (n)" bit may be activated by setting it equal to one.

If, at decision step 410, it is determined that the "saved by version (n)" bit is activated, then the method proceeds to step 499 and the method ends. The "saved by version (n)" bit will be activated if the file has been previously saved by version (n). It should be understood that, in the preferred embodiment, decision step 410 is eliminated and the "saved by version (n)" bit is activated every time the file is saved by version (n).

Activating the "saved by version (n)" bit is described above in reference to FIG. 4. Versions of the program module released after version (n) are designed to respond appropriately to an activated "saved by version (n)" bit. One such design is described below in reference to FIG. 5.

Figure 5:
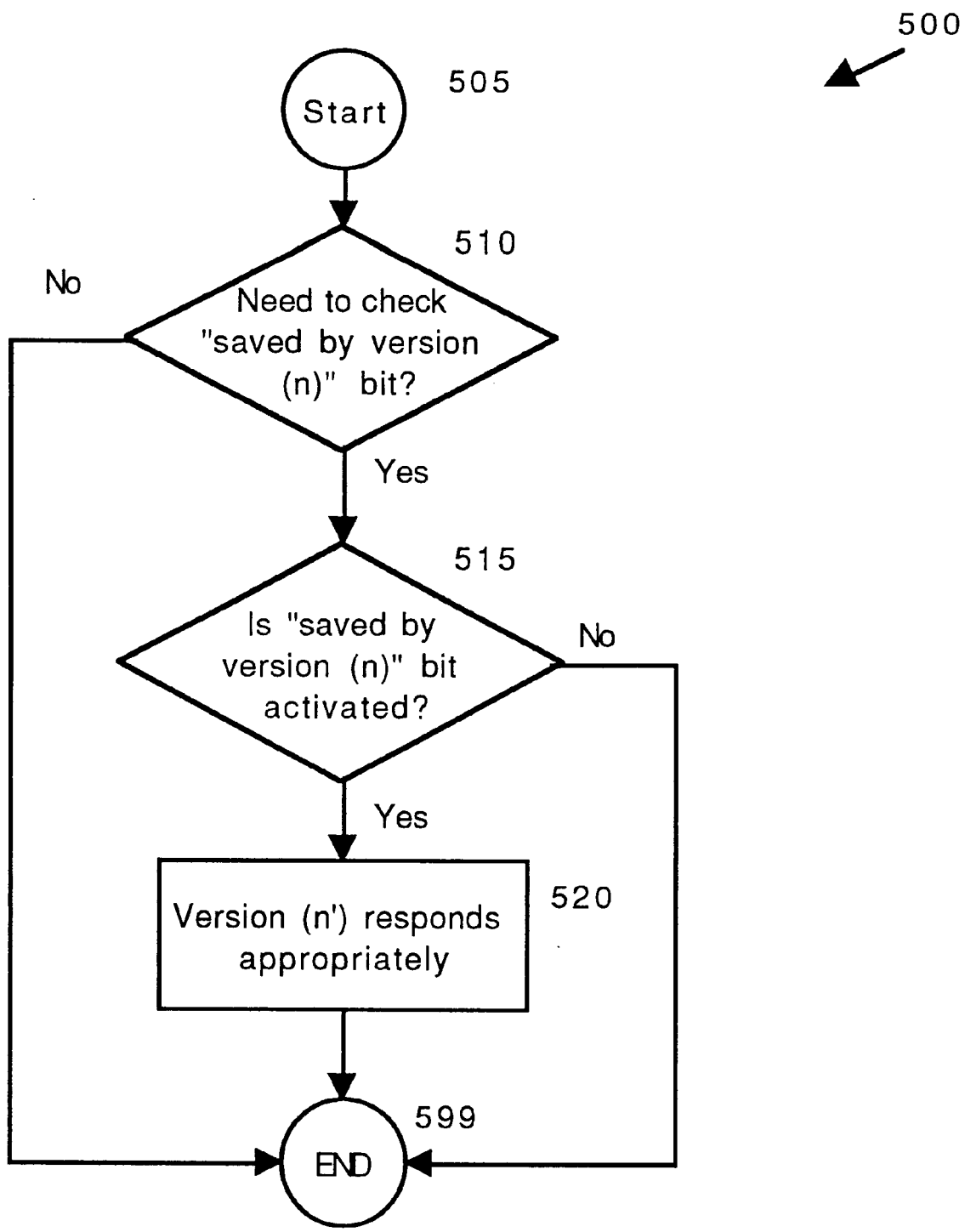
FIG. 5 is a flowchart illustrating a method for examining a "saved by version (n)" bit that is executed by version (n') when opening a file in accordance with an embodiment of the present invention.

FIG. 5 is a flowchart illustrating a method 500 for examining the "saved by version (n)" bit that is executed by version (n') 37b when opening a file in accordance with an embodiment of the present invention. The method 500 begins at start step 505 and proceeds to decision step 510 when version (n') opens a file. It should be understood that it is possible that version (n) records the undo stack properly, i.e., it does not contain any bugs in its recording of the undo stack. If it is determined that version (n) records the undo stack properly, then the "saved by version (n)" bit may be ignored by version (n'). Thus, decision step 510, as described below, is programmed into version (n') by the software designers based upon whether or not any bugs were found in the undo stack of version (n).

At decision step 510, it is determined whether or not it is necessary to check the status of the "saved by version (n)" bit. If so, then the method 500 proceeds to decision step 515. If not, then the method ends at step 599.

At decision step 515, it is determined whether or not the "saved by version (n)" bit is activated. If not, then the method ends at step 599. However, if the "saved by version (n)" bit is activated, then the method proceeds to step 520.

At step 520, version (n') responds appropriately to the activated "saved by version (n)" bit. The steps of responding appropriately are determined by the software designers of version (n'). The reason that this determination is made in the future is that, at least theoretically, these software designers will know the bugs in the undo stack of version (n), the manner in which version (n') responds to these bugs, and whether version (n') can handle an undo stack with undo entries saved by version (n). Based upon these determinations, the software designers of version (n') will design version (n') to respond appropriately to an activated "saved by version (n)" bit so that version (n') can handle a document saved by version (n) in a graceful manner.

For example, it could be that version (n) corrupts certain types of undo entries, but all others are not corrupted. In that case, at step 520, version (n') would simply use the "saved by version (n)" bit as a cue to look for those particular undo entries that are corrupt and ignore those undo entries.

As another example, it could be that version (n) corrupts the undo stack in such a way that the whole undo stack must be ignored by version (n'). In that case, at step 520, version (n') would "respond appropriately" by ignoring the undo stack of a document that had been saved by version (n). As further examples, version (n') may "respond appropriately" by displaying on monitor 47 (FIG. 1) a warning dialog to the user or by attempting to repair corrupted entries of the undo stack.

"Warning from Future Version" Bit

The "warning from future version" bit may be activated, or set, by version (n') 37b, i.e., a version of "WORD" released subsequently to "WORD 8.0". The "warning from future version" bit may be used to indicate that the undo stack of a document's file format is unsafe for version (n) to open. For example, bugs in the undo stack of version (n) may be found requiring that the software designers make changes in the undo stack of version (n'). These changes may be such that version (n) will have problems reading an undo stack saved by version (n').

The determination of whether or not to activate the "warning from future version" bit is made when version (n') is designed. At that time, the software designers will be aware of most of the bugs in the undo stack of version (n) and will also be aware of how those bugs will be corrected by version (n'). The software designers will also be aware of changes in the manner that (n') stores properties.

The semantics of an activated "warning from future version" bit are that version (n') has determined that version (n) can open a document, but that version (n) needs to be extremely careful in dealing with the undo stack. Version (n') may activate the "warning from future version" bit if the software designers of version (n') determine that this is necessary. For example, version (n') may be programmed to activate the "warning from future version" bit when it saves every document, when it saves some documents, or never at all.

One implication to version (n) of an activated "warning from future version" bit is that version (n) may have some serious bugs in recording the undo stack. A second implication of the "warning from future version" bit is that it is possible that version (n') fixed those bugs in such a way that version (n') saves the undo stack in a format which version (n) cannot handle.

If it is discovered that version (n) cannot properly handle certain undo stack entries recorded by version (n'), version (n') will be programmed to activate the "warning from future version" bit upon saving a document with one of those undo stack entries. When version (n) determines that the "warning from future version" bit is activated for a document's file format, version (n) will open the document in the safest mode possible as described below.

Having described the general implications of the "warning from future version" bit, a description of the method 600 for activating the bit is described below.

Figure 6:
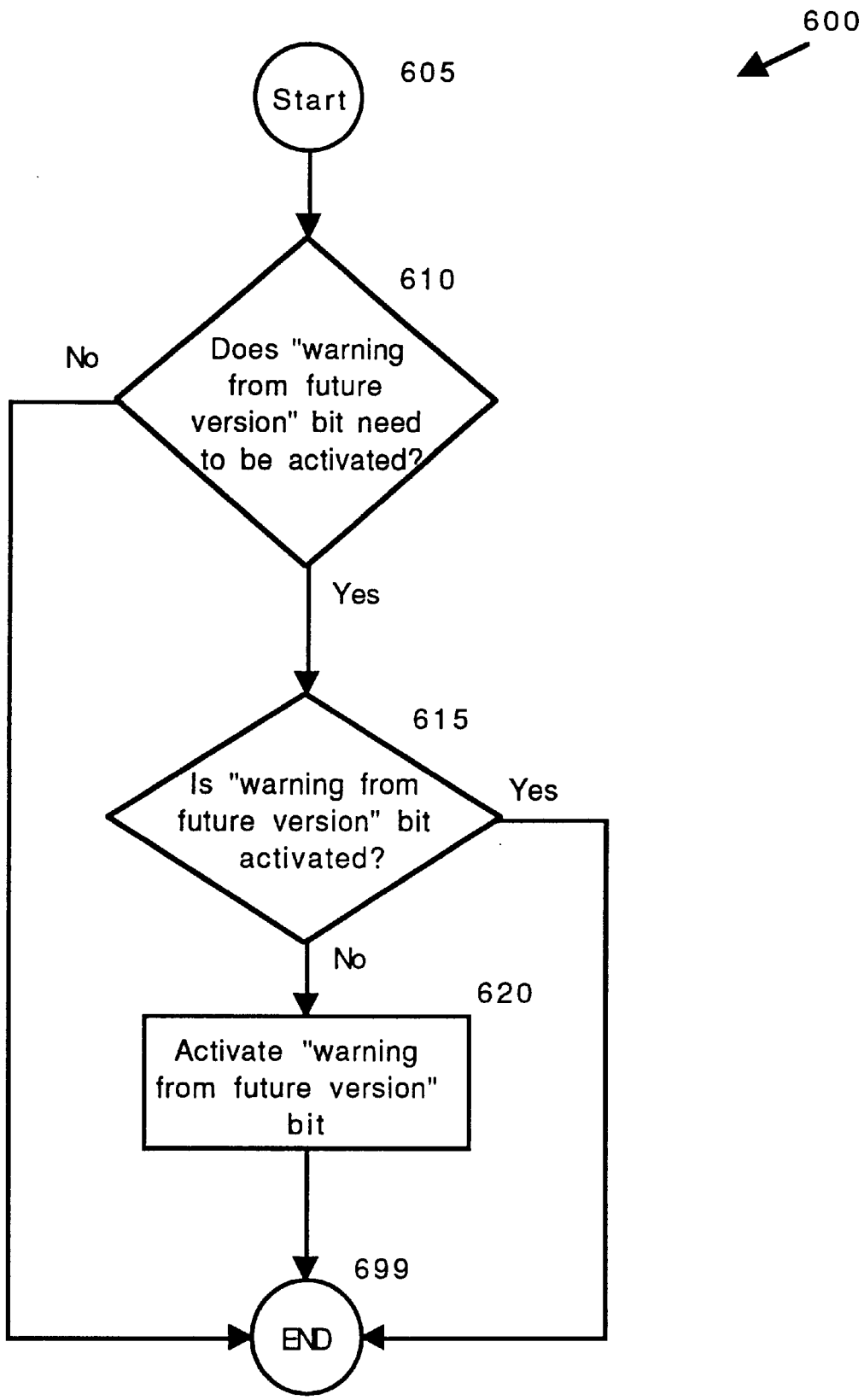
FIG. 6 is a flowchart illustrating a method for activating a "warning from future version" bit in accordance with an embodiment of the present invention.

FIG. 6 is a flowchart illustrating a method 600 for activating the "warning from future version" bit 325 in accordance with an embodiment of the present invention. Those skilled in the art will appreciate that this exemplary embodiment is a computer-implemented process that is carried out by the computer in response to input from the user and instructions provided by the preferred application program module.

The method 600 begins at step 605 and proceeds to decision step 610 when a file, or document, is saved by version (n') 37*b*. At decision step 610, it is determined whether or not the "warning from future version" bit needs to be activated.

If, at decision step 610, it is determined that the "warning from future version" bit does not need to be activated, then the method ends at step 699. However, if, at decision step 610, it is determined that the "warning from future version" bit needs to be activated, then the method proceeds to decision step 615.

The software designers of version (n') might know that there are certain particular undo stack entries that version (n) can not handle. Version (n') would then be designed to only turn on the "warning from future version" bit when it is saving one of those undo stack entries. Version (n') would not turn on the "warning from future version" bit if a document's undo stack does not contain one of those undo stack entries. Thus, it will be apparent to one skilled in the art that version (n') can be designed with logic and flexibility about when to activate the "warning from future version" bit.

At decision step 615, it is determined whether or not the "warning from future version" bit is activated. If so, then the method ends at step 699 and the document is saved in the manner known to those skilled in the art. However, if, at decision step 615, it is determined that the "warning from future version" bit is not activated, then the method proceeds to step 620. The "warning from future version" bit is activated at step 620 and the method ends at step 699.

Activating the "warning from future version" bit is described above in reference to FIG. 6. Version (n) 37*a* of the program module is designed to respond appropriately to an activated "warning from future version" bit. The preferred method for checking the status of the "warning from future version" bit is described below in reference to FIG. 7.

Figure 7:
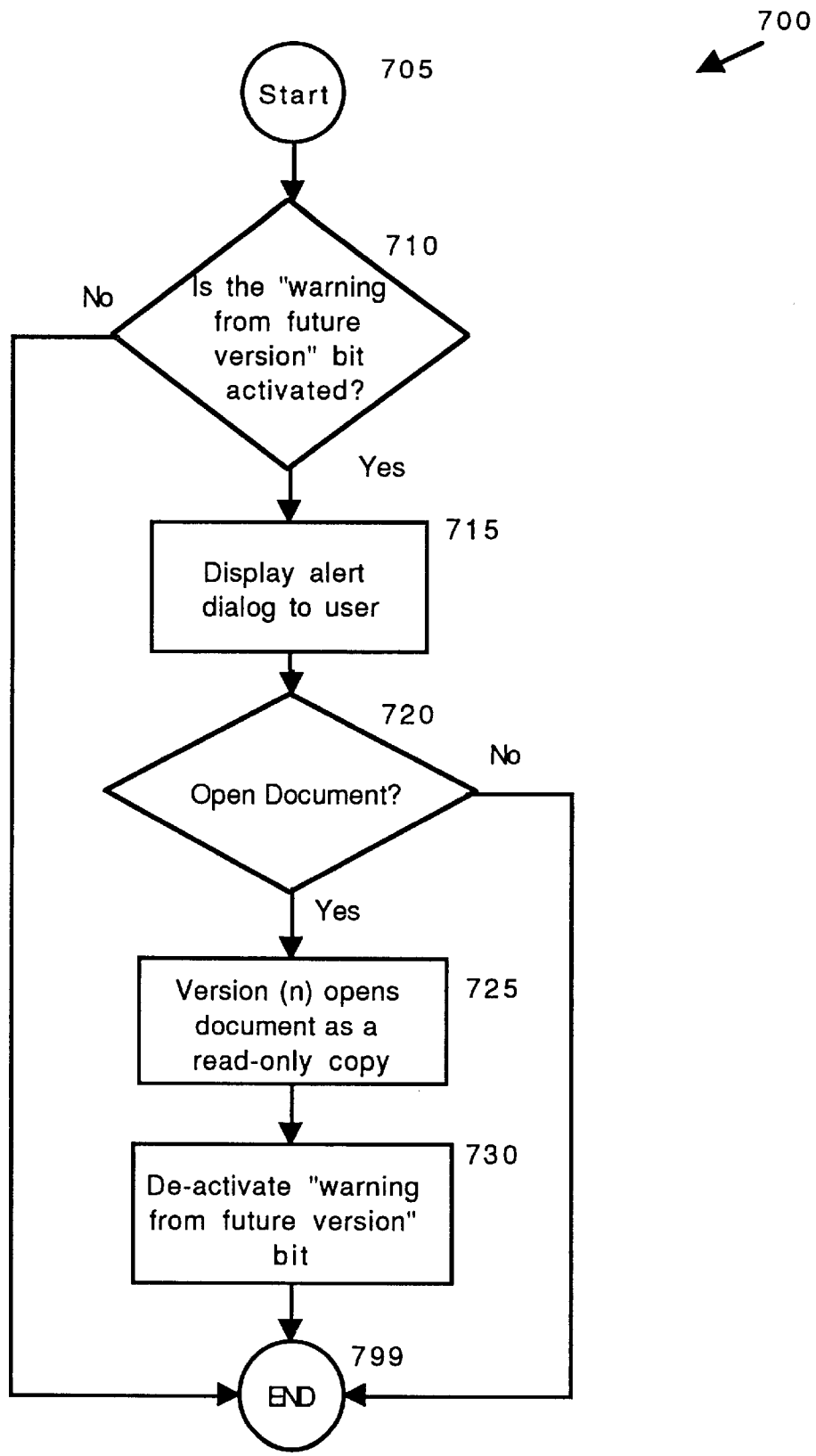
FIG. 7 is a flowchart illustrating the preferred method for checking a "warning from future version bit" as executed by version (n) when opening a file.

FIG. 7 is a flowchart illustrating the preferred method 700 for checking the status of the "warning from future version bit" as executed by version (n) 37*a* when opening a file. The method 700 begins at start step 705 and proceeds to decision step 710 when version (n) opens a file.

At decision step 710, it is determined whether or not the "warning from future version" bit is activated. If not, then the method ends at step 799. However, if the "warning from future version" bit is activated, then the method proceeds to step 715.

At step 715, an alert dialog is displayed to the user. Preferably, the alert dialog asks the user to answer the following query: "This version does not support some of the features in this document because it was created with a later version. Would you like to open a copy of the document with these features removed?" In response to this query, the user selects either an "OK" button or a "Cancel" button in the alert dialog.

At decision step 720, it is determined whether or not the user wants to open the document. If not, then the method ends at step 799. However, if the user wants to open the document, then the method proceeds to step 725

At step 725, the document is opened as a read-only copy of the document. Preferably, the undo stack and any other related structures or features are not loaded with this read-only copy. The method then proceeds to step 730.

At step 730, the "warning from future version" bit is de-activated because the document has been rendered safe by preventing the loading of the undo stack and other related structures. The method then ends at step 799.

It should be noted that the "warning from future version" bit allows finer version distinctions than those made in the prior art. For instance, in the prior art, even a minor change in a file format would result in a new version stamp. Thus, sometimes an older version of an application program module would have to make a binary yes/no decision whether or not it could open a document saved by a version with a higher version stamp. Using the "warning from future version" bit, these yes/no type decisions are typically avoided because the file format does not have to be changed when minor changes are made to the file format. Instead, version (n) will be able to open the document in a safe condition, such as by disposing of some information or inactivating a corrupt feature.

From the foregoing description, it will be apparent to those skilled in the art that the present invention provides a method and system for preserving document integrity between potentially partially incompatible versions of a program module. Preserving document integrity particularly refers to maintaining forwards compatibility and backwards compatibility between different versions of a program module.

It will further be apparent to those skilled in the art that the present invention provides a method and system for providing backwards compatibility that does not require writing complicated and detailed conversion code. Instead, the "saved by version (n)" bit may be used to communicate to version (n') that version (n) has saved a document. Thus, version (n') will know that certain features, such as the undo stack, may need to be ignored or some other appropriate action taken by version (n').

It will further be apparent to those skilled in the art that the present invention provides a method and system for providing forwards compatibility that does not require the use of an external converter. Instead, the "warning from future version" bit may be used to communicate to version (n) that a subsequently-released version has saved a document. Thus, version (n) will know that certain features, such as the undo stack, may need to be ignored when opening the document. Thus, no external converter is needed.

It will still be further apparent that the present invention provides a method and system for providing forwards compatibility that accommodates minor changes in file format. For example, if the undo stack of version (n') is slightly changed, then the "warning from future version" bit may be activated so that the minor change in file format will be accommodated. Version (n) will read the activated "warning from future version" bit and ignore the undo stack or certain undo stack entries.

Of course, those skilled in the art will recognize that the "saved by version (n)" bit and "warning from future version" bit have been described with reference to the undo stack, but could be used in conjunction with any saved feature of a program module. Thus, it should be apparent that the present invention allows version (n) of a program module to signal to version (n') of the program module that version (n) has edited a document, thus possibly corrupting a feature of the program module as far as version (n') is concerned. It should further be apparent to those skilled in the art that the present invention provides a method and system for version (n') of a program module to signal to version (n) of the program module that the document was edited by version (n') and certain features may be corrupt as far as version (n) is concerned.

It should be understood by those skilled in the art that the designers of version (n) do not know under what conditions the "warning from future version" bit will be activated. These decisions are made by the designers of version (n'). For example, if the software designers of version (n') determine that version (n') corrupts the undo stack when saving a document, then the "warning from future version" bit will be activated. Thus, the decision as to the conditions when version (n) should and should not read the undo stack of version (n') is left for the designers of version (n'). The results of this decision are communicated to version (n) through the "warning from future version" bit.

It should further be understood that arbitrary code could be provided in version (n) and that, based upon the value of the "warning from future version" bit, version (n') may communicate with version (n) to signal which code version (n) should execute based on decisions made by the software designers of version (n').

It should still be further understood that although the present invention is described above in reference to the "saved by version (n)" bit and the "warning from future version" bit, other data structures known to those skilled in the art may be utilized without departing from the spirit or scope of the present invention, including, but not limited to, document properties, flags, bytes, or a plurality of bits. For example, a multiple bit property may be used with different actions associated with different values of the multiple bit property.

Although the present invention has been described above as implemented in the preferred application program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. For an electronic system for creating and editing an electronic file, a method for preserving file integrity between a first version of the electronic system and a second version of the electronic system, the second version developed after the first version, the method comprising the steps of:

setting a backwards compatibility property in a file format of a file saved by the first version;

causing the second version to determine whether the backwards compatibility property is activated when opening the file; and if so, then causing the second version to respond to the activated backwards compatibility property so that the file is opened safely by the second version in such a manner that backwards compatibility is maintained by:
checking the file for one or more features that are not supported by the second version, and
opening the file with the features disabled.

2. The method recited in claim 1 wherein:
the step of checking the file for one or more features that are not supported by the second version comprises the step of causing the second version to search for corrupt undo stack entries of the file; and
the step of opening the file with the features disabled comprises the step of causing the second version to open the file while ignoring the corrupt undo stack entries.

3. The method recited in claim 1, wherein:
the step of checking the file for one or more features that are not supported by the second version comprises the step of causing the second version to search for corrupt features of the file; and
the step of opening the file with the features disabled comprises the step of causing the second version to open the file while ignoring the corrupt features.

4. A computer-readable medium having computer-executable instructions for performing the steps recited in claim 1.

5. A computer adapted to perform the steps recited in claim 1.

6. For an electronic system for creating and editing an electronic file, a method for preserving document integrity between a first version of the electronic system and a second version of the electronic system, the second version being released after the first version, the method comprising the steps of:

setting a forwards compatibility property equal to one of a set of predetermined values in a file format of a file saved by the second version;

causing the first version to determine whether the forwards compatibility property is set equal to one of the set of predetermined values in the file;

if so, then determining whether the file should be opened; and if the file should be opened, then causing the first version to open the file in a safe condition;

wherein the forwards compatibility property comprises a plurality of bits, and wherein the forwards compatibility property may be set equal to a plurality of values.

7. The method recited in claim 6 wherein the step of determining whether the file should be opened comprises the steps of:

displaying an alert dialog;

receiving an input indicative of whether the file should be opened; and if so, then opening the file in the safe condition.

8. A computer-readable medium having computer-executable instructions for performing the steps recited in claim 6.

9. A computer adapted to perform the steps recited in claim 6.

10. For an electronic system for creating and editing an electronic file, a method for preserving document integrity between a first version of the electronic system and a second version of the electronic system, the second version being released after the first version, the method comprising the steps of:

setting a forwards compatibility property equal to one of a set of predetermined values in a file format of a file saved by the second version;

causing the first version to determine whether the forwards compatibility property is set equal to one of the set of predetermined values in the file;

if so, then determining whether the file should be opened; and if the file should be opened, then causing the first version to open the file in a safe condition; and wherein the step of causing the first version to open the file in a safe condition comprises the steps of:
causing the first version to open the file as a read-only copy of the file without loading a corrupt feature; and causing the first version to de-activate the forwards compatibility property by setting it equal to a second predetermined value.

11. The method recited in claim 10, further comprising the steps of:
   displaying an alert dialog;
   receiving an input indicative of whether the file should be opened; and
   if so, then opening the file in the safe condition.

12. A computer-readable medium having computer-executable instructions for performing the steps recited in claim 10.

13. A computer adapted to perform the steps recited in claim 10.

* * * * *